United States Patent [19]

Kim et al.

[11] Patent Number: 5,602,195

[45] Date of Patent: Feb. 11, 1997

[54] POLYMERIC FILM AND PROCESS FOR THE PREPARATION THEREOF

[75] Inventors: Moon-Sun Kim; Sang-Il Kim, both of Suwon-si; Young-Jin Lee, Anyang-si; Bum-Sang Kim, Seoul, all of Rep. of Korea

[73] Assignee: SKC Limited, Seoul, Rep. of Korea

[21] Appl. No.: 505,979

[22] Filed: Jul. 24, 1995

[30] Foreign Application Priority Data

| Jul. 27, 1994 | [KR] | Rep. of Korea | 94-18272 |
| Jul. 27, 1994 | [KR] | Rep. of Korea | 94-18273 |
| Dec. 1, 1994 | [KR] | Rep. of Korea | 94-32362 |
| Dec. 7, 1994 | [KR] | Rep. of Korea | 94-33121 |
| Dec. 9, 1994 | [KR] | Rep. of Korea | 94-33402 |

[51] Int. Cl.$^6$ ............................................ C08K 5/42
[52] U.S. Cl. ........................ 524/84; 524/161; 524/912; 525/177
[58] Field of Search .................... 524/161, 84, 912; 525/177

[56] References Cited

U.S. PATENT DOCUMENTS

| 3,367,926 | 2/1968 | Voeks | 524/161 |
| 3,644,310 | 2/1972 | Hopkins | 524/911 |
| 3,644,345 | 2/1972 | Siegrist et al. | 524/84 |
| 3,663,498 | 5/1972 | Uebe et al. | 524/161 |
| 4,046,837 | 9/1977 | Carroll | 525/177 |
| 4,564,658 | 1/1986 | Liu | 525/177 |
| 4,572,852 | 2/1986 | Gartland et al. | 525/177 |
| 4,679,795 | 7/1987 | Melvin et al. | 524/84 |
| 4,713,408 | 12/1987 | Takahashi et al. | 524/161 |

FOREIGN PATENT DOCUMENTS 63-170431 7/1988 Japan ............................ 524/425

*Primary Examiner*—Veronica P. Hoke
*Attorney, Agent, or Firm*—Anderson Kill & Olick P.C.

[57] ABSTRACT

A polymeric film, which comprises 100 parts by weight of a polyester resin having an intrinsic viscosity ranging from 0.4 to 0.9 dl/g, 5 to 50 parts by weight of a polyolefin resin having a melt flow index ranging from 1.0 to 25 g/10 min and/or a styrene resin having a melt flow index ranging from 1.5 to 20 g/10 min, and 0.01 to 1.0 part by weight of a metal sulfonate of the following formula (I) having an acid value of 1.0 mg KOH/g or less, has an excellent antistatic property, printability, a good appearance and touchiness, as well as an improved film characteristics such as bulk density and heat stability.

$$R_1-C_6H_4-SO_3Me \quad (I)$$

wherein, $R_1$ is a $C_5$–$C_{20}$ alkyl group; and

Me is an alkali metal or alkali earth metal.

8 Claims, No Drawings

POLYMERIC FILM AND PROCESS FOR THE PREPARATION THEREOF

FIELD OF THE INVENTION

The present invention relates to a polymeric film having an excellent antistatic property, printability and appearance, and improved film characteristics such as bulk density, thermal stability, etc.; and to a process for the preparation thereof.

BACKGROUND OF THE INVENTION

Polyesters are known to possess good chemical and physical stability, high mechanical strength, durability, heat and chemical resistance and electrical insulation properties; and, therefore, have been widely used in manufacturing various industrial products. In particular, polyethylene terephthalate films, due to their good elasticity, dimensional stability and slipperiness, have been used as magnetic recording media, condensers, photographic films, industrial products, packaging and labelling materials and the like.

Recently, polyester films have been increasingly used as a paper substitute in a variety of applications. However, such polyester films differ from paper in clarity, color and rigidity; and are rather inconvenient for use due to their high density.

Extensive attempts have been made to develop low-weighted polyester films with a paper-like softness while maintaining their desired properties. For example, Japanese Patent Laid-open Publication Nos. 87-243120 and 90-206622 describe the incorporation of inorganic particles into a polyester; Japanese Patent Laid-open Publication No. 83-50625 discloses a method for preparing a low-weighted polyester film by incorporating a foaming agent in a polyester; and Japanese Patent Laid-open Publication No. 82-49648 offers a method for preparing a low-weighted polymeric film with improved surface properties by blending a polyolefin resin with a polyester and extending the resultant mixture to form microvoids on the surface and inside of the film obtained therefrom.

However, such attempts have their own drawbacks and problems. When a large amount of inorganic particles are incorporated in a polyester film, its density tends to increase. In case a foaming agent is incorporated in a polyester, the microvoids formed become poorly dispersed and physical properties of the film are difficult to control. Further, in case a polyolefin resin is blended with a polyester, due to the poor heat resistance of the polyolefin, the mechanical properties of the resulting polymer film are apt to deteriorate. Also, since a polyolefin tends to generate and accumulate static electricity, the polyester film blended with a polyolefin may become highly electrostatic and suffer from low printability, which would limit its usage as a paper substitute.

SUMMARY OF THE INVENTION

It is, therefore, a primary object of the present invention to provide a low-weighted polymeric film having good touchiness, low bulk density, improved thermal stability, excellent antistatic property, printability and appearance as a paper substitute, and a process for the preparation thereof.

In accordance with the present invention, there is provided a polymeric film which comprises 100 parts by weight of a polyester resin having an intrinsic viscosity ranging from 0.4 to 0.9 dl/g, 5 to 50 parts by weight of a polyolefin resin having a melt flow index ranging from 1.0 to 25 g/10 min and/or a styrene resin having a melt flow index ranging from 1.5 to 20 g/10 min, and 0.01 to 1.0 part by weight of a metal sulfonate of the following formula (I) having an acid value of 1.0 mg KOH/g or less:

$$R_1\text{—}C_6H_4\text{—}SO_3Me \qquad (I)$$

wherein, $R_1$ is a $C_5$–$C_{20}$ alkyl group; and

Me is an alkali metal or alkali earth metal.

The polymeric film of the present invention may also comprise 0.005 to 0.5 part by weight of a hindered phenol compound and/or 0.0005 to 0.5 part by weight of an organic fluorescent whitening agent, based on 100 parts by weight of the polyester resin.

DETAILED DESCRIPTION OF THE INVENTION

A preferred embodiment of the polymeric film of the present invention comprises 100 parts by weight of the polyester resin, 5 to 40 parts by weight of the polyolefin resin, 20 to 50 wt % of the styrene resin based on the weight of the polyolefin resin, and 0.01 to 1.0 part by weight of the metal sulfonate of the formula (I).

Another preferred embodiment of the polymeric film of the present invention comprises 100 parts by weight of the polyester resin, 5 to 50 parts by weight of the styrene resin, 0.01 to 1.0 part by weight of the metal sulfonate of the formula (I), 0.005 to 0.5 part by weight of a hindered phenol compound and 0.0005 to 0.5 part by weight of an organic fluorescent whitening agent.

A further preferred embodiment of the polymeric film of the present invention comprises 100 parts by weight of the polyester resin, 5 to 50 parts by weight of the polyolefin resin, 0.01 to 1.0 part by weight of the metal sulfonate of the formula (I) and 0.005 to 0.5 part by weight of a hindered phenol compound.

The polyester which can be employed in the present invention has an intrinsic viscosity ranging from 0.4 to 0.9 dl/g, preferably from 0.5 to 0.7 dl/g, when determined at a concentration of 0.3 g per 25 ml of orthochlorophenol at a temperature of 35° C. The polyester may be prepared by the polycondensation of a polyhydric organic acid and a polyhydric alcohol. The organic acid suitable for use in the present invention includes carboxylic acids, preferably aromatic dicarboxylic acids; and the alcohol includes glycols, preferably akylene glycols.

Representative of the aromatic dicarboxylic acids include: dimethyl terephthalic acid, terephthalic acid, isophthalic acid, naphthalene dicarboxylic acid, cyclohexane dicarboxylic acid, diphenoxyethane dicarboxylic acid, diphenyl dicarboxylic acid, diphenyl ether dicarboxylic acid, anthracene dicarboxylic acid and α,β-bis(2-cholorophenoxy)ethane-4,4'-dicarboxylic acid. Among these, dimethyl terephthalic acid and terephthalic acid are most preferred.

Exemplary alkylene glycols include: ethylene glycol, trimethylene glycol, tetramethylene glycol, pentamethylene glycol, hexamethylene glycol and hexylene glycol. Among these, ethylene glycol is most preferred.

The polyester of the present invention comprises at least 60% by weight of a homopolyester of polyethylene terephthalate and the remainder being other units. The copolymer components include: diol compounds such as diethylene glycol, propylene glycol, neopentyl glycol, polyethylene glycol, p-xylene glycol, 1,4-cyclohexane dimethanol and sodium 5-sulforesorcine; dicarboxylic acids such as adipic acid and sodium 5-sulfoisophthalic acid; and polyfunctional carboxylic acids such as trimellitic acid, pyromellitic acid and the like.

An antistatic agent which can be incorporated in the polymeric resin of the present invention is a metal sulfonate of the formula (I) having an acid value of 1.0 mg KOH/g or less:

$$R_1-C_6H_4-SO_3Me \qquad (I)$$

wherein, $R_1$ is a $C_5-C_{20}$ alkyl group; and

Me is an alkali metal or alkali earth metal.

The metal sulfonate may be added in an amount ranging from 0.01 to 1.0 part by weight, preferably from 0.02 to 0.5 part by weight based on 100 parts by weight of the polyester resin.

Suitable metal sulfonates include: potassium octylbenzene sulfonate, potassium nonylbenzenesulfonate, potassium undecyl benzenesulfonate and a mixture thereof. Such incorporation of the metal sulfonate imparts a good antistatic property to the film as well as increases surface tension of the film, thereby reducing the loss of information on the magnetic cards, etc. and improving the receptivity of ink and other coating compositions.

The polymeric film of the present invention may also comprise a hindered phenol compound, which inhibits the occurrence of a radical chain reaction in the first thermal oxidation of the polyolefin, and improves heat-resistance of polyolefin. Examples of the hindered phenol compound include: tetrakis 3,5-di-t-butylhydroxyphenylpropanoyloxymethylmethane, octadecyl-3,5-di-t-butyl-4-hydroxyphenylpropanoate, 2-hydroxy-4-n-octyloxybenzo phenone and 2,4-di-t-butylphenyl-3,5-di-t-butyl-4-hydroxybenzoate. These compounds can be used either alone or in a mixture of 2 or more.

The hindered phenol compound may be added in an amount ranging from 0.005 to 0.5 part by weight based on 100 parts by weight of the polyester resin.

Additionally, an organic fluorescent whitening agent such as stilbene or oxazole compound may be incorporated in the polymeric film of the present invention. The organic fluorescent whitening agent increases the reflectivity of the film at the visible region, by absorbing the light energy of ultraviolet region(330–380 nm), transferring the energy to the visible region (400–450 nm), and then emitting the light. Coumarins, pyrazolines, imidazoles, triazoles, naphthaimides may also be employed, however, stilbene or oxazole compounds, such as stilbenes, oxazoles and bisbenzoazoles, are preferred due to their high thermal resistance necessary for the production of a polyester resin.

The whitening agent is added in an amount so that the reflectivity at 440 nm becomes greater than 75%. The amount preferably ranges from 0.0005 to 0.5 part by weight based on 100 parts by weight of the polyester resin.

In addition to the above ingredients, the polymeric film of the present invention may further comprise other common additives such as polycondensation catalyst, dispersing agent, other anti-static agent, crystallization accelerator, nucleating agent or anti-blocking agent, in effective amounts which do not adversely affect the desired characteristics of the inventive film. Besides, an inorganic filler, selected from the group consisting of barium sulfate, titanium dioxide, silicon dioxide, calcium carbonate, magnesium oxide, talc and a mixture thereof, may be added in an amount of 20 parts by weight or less based on 100 parts by weight of the polyester resin.

When the polyolefin resin and/or styrene resin together with the polyester resin is mixed, extruded, and then extended to form a film, microvoids are formed on the surface and inside of the film, imparting improved surface properties as well as low density to the film.

Suitable polyolefin resins for the present invention include conventional polyethylene, polypropylene, polymethylpentene and a mixture thereof, having a melting flow index ranging from 1.0 to 25 g/10 min(200° C., 5 kg). The polyolefin resin may be mixed with the polyester resin at a ratio ranging from 5 to 50 parts by weight, preferably from 8 to 25 parts by weight based on 100 parts by weight of the polyester resin.

Suitable styrene resins, which can be mixed with the polyester resin of the present invention, may be prepared from a homopolystyrene containing at least 60% by weight of polystyrene and the remainder being other units. The copolymer components include acrylonitrile, butadiene and the like. The styrene resin used in the present invention has a melt flow rate of 1.5 to 20 g/10 min(200° C., 5.0Kg load), and preferably 2.5 to 15 g/10 min. The styrene resin may be mixed in an amount ranging from 5 to 50 parts by weight, preferably 10 to 30 parts by weight based on 100 parts by weight of the polyester resin.

In case a polyolefin resin and a styrene resin are mixed together with a polyester resin, the polyolefin resin is preferably mixed in an amount ranging from 5 to 40 parts by weight based on 100 parts by weight of the polyester resin and the styrene resin is preferably mixed in an amount of 20 to 50% by weight based on the weight of the polyolefin resin.

The polymeric film of the present invention may be prepared by the process which comprises: compounding a polyester resin together with a polyolefin resin and/or styrene resin to give a primary resin mixture; re-melting and extruding the primary resin into an amorphous cast sheet; and then extending the sheet in a longitudinal and a transverse directions to form a film. The term "compounding" means melt-mixing 2 or more solid components at a given ratio to give a homogeneous mixture.

The present invention also provides a process for the preparation of a polymeric resin master chip having an excellent dispersability and uniform physical properties.

The process for the preparation of a polymeric resin master chip of the present invention comprises: compounding a polyester resin, at least one of a polyolefin resin and styrene resin, and an ingredient in a compounder under the condition satisfying the following formulae to give a method resin mixture; extruding the mixture; and then cooling and cutting the mixture to give a polymeric resin master chip:

$$200° C. \leq T_i \leq 250° C.$$

$$T_f = T_i + 30° C., \text{ and}$$

$$T_f + 10° C. \leq T_p \leq T_f + 50° C.$$

wherein, $T_i$ is an initial inlet temperature of the compounder;

$T_f$ is a final outlet temperature of the compounder; and $T_p$ is a temperature of the extruded resin.

According to the present inventive process, the initial inlet temperature of the compounder($T_i$) is controlled in the range of 200° to 250° C., preferably 220° to 240° C. The final outlet temperature of the compounder ($T_f$) is controlled in the range of 230° to 280° C., preferably 250° to 270° C. Further, the retention time of the resin mixture in the compounder(t) may be controlled in the range of 1 to 5 minutes, preferably 2 to 4 minutes. Finally, the temperature of the extruded resin ($T_p$) is controlled in the range of 240° to 330° C., preferably 260° to 310° C.

The polymeric resin master chip obtained according to the present inventive process may be re-melted and extruded in a conventional manner to give a cast sheet, and then the sheet may be extended in a longitudinal and a transverse direction to give a polymeric film. The draw temperature may range from 60° to 150° C., and the draw ratio may range from 2.5 to 6 in a longitudinal and a transverse directions.

The following Examples are intended to illustrate the present invention more specifically, without limiting the scope of the invention.

In Examples and Comparative Examples, the properties of the polymer film were evaluated in accordance with the following methods.

1. Bulk Density

The bulk density of the film was measured by way of floating method while maintaining the density gradient column comprised of carbon tetrachloride and n-heptane at 25° C.

2. Antistatic Property

The surface resistance of the film was measured by using an insulation resistance measurement (Hewlett-Packard Company, U.S.A.) at 20° C. and 65% of relative humidity. The applied voltage was 500V. The measured value was given in ohm($\Omega$) unit. As the surface resistance of the film decreases, the anti-static property thereof increases.

3. Color-b

By way of employing a light source color difference meter (Zeniru Industrial Inc. of Japan, Model No.:SZS-Σ80), Color-b was measured at an angle of 2° using a C light source as a measuring light source.

4. Reflectivity at 440 nm

By way of employing a light source color difference meter (Zeniru Industrial Inc. of Japan, Model No.:SZS-Σ80), the reflectivity at 440 nm was determined as the percentage of the light reflected at 440 nm.

5. Strength at breakage

The strength at breakage of the film was determined by measuring the tensile strength of the film in accordance with ASTM D882 using UTM4206(Instron).

6. Receptivity to an Ink/Coating Composition—Printability

The printability of the film was evaluated by measuring the degree of coagulation of Rulee Index Standard Solution (Gakoujinyaku Co. of Japan) on the surface of the film, on the basis of the following:

o: no coagulation
Δ: 2 to 4 coagulations per unit area(10 cm×10 cm)
X: more than 5 coagulations per unit area(10 cm×10 cm)

7. Processability

The frequency of breakages in film making process was measured and the processability was judged on the basis of the following:

A : less than once a day
B : 1–3 times a day
C : more than 3 times a day

8. Uniformity in physical property

Densities of the film were measured at intervals of 10 cm in overall width of the film and their deviations were calculated. Then, the uniformity in physical properties in a film was judged on the basis of the following:

A: deviation is less than 5%
B: deviation ranges from 5% to 10%
C: deviation ranges from 10% to 20%
D: deviation is more than 20

EXAMPLE 1-1

60 parts by weight of dimethyl terephthalate and 40 parts by weight of ethylene glycol were mixed and transesterified in the present of a transesterification catalyst to form a polyethylene terephthalate monomer, i.e., bis-2-hydroxyethyl terephthalate. To the resultant, 5 parts by weight of titanium dioxide of cubic crystalline structure having an average particle diameter of 0.5 μm, 0.20 part by weight of tetrakis 3,5-di-t-butylhydroxyphenylpropanoyloxymethylmethane, 0.002 part by weight of oxazole compound (C. I. Fluorescent Brightener 135), 0.20 part by weight of potassium octylbenzenesulfonate and a conventional polycondensation catalyst were added, and the mixture was polycondensed to obtain a polyester resin having an intrinsic viscosity of 0.610 dl/g. The obtained polyester resin and polystyrene(GP-PS) having a melt flow index of 8.0 g/10 min were melt-mixed at a ratio of 100:25 using a conventional compounding method to give a primary resin mixture.

The obtained resin mixture was dried, melted, and extruded to form a cast sheet. The sheet was extended in a draw ratio of 3.5 in a longitudinal and a transverse directions to provide a biaxially oriented polymeric film having the thickness of 150 μm.

The properties of the film were measured and the results are shown in Table 1.

As shown in Table 1 below, the film thus prepared exhibits excellent properties in general.

EXAMPLES 1-2 to 1-6

The procedure of Example 1-1 was repeated except that the amounts of the additives and the polystyrene resin were varied as shown in Table 1 below.

The properties of the film were measured and the results are shown in Table 1.

As shown in Table 1 below, the films thus prepared exhibit excellent properties in general.

COMPARATIVES EXAMPLES 1-1 to 1-12

The procedure of Example 1-1 was repeated except that the amounts of the additives and the polystyrene resin were varied as shown in Table 1 below.

The properties of the film were measured and the results are shown in Table 1.

As shown in Table 1 below, the films thus prepared exhibit poor properties in general.

TABLE 1

| | | Additives* | | | | Polystyrene* | | Physical properties of film | | | | | | |
|---|---|---|---|---|---|---|---|---|---|---|---|---|---|---|
| | | (A) | (B) | (C) | (D) | Amount | Melt flow index g/10 min | Bulk Density g/cc | Surface Resistance Ω | Strength at Breakage kg/mm² | Reflectivity at 440 nm % | Color b | Touchiness | Appearance |
| unit | | part by weight | | | | | | | | | | | | |
| Ex. | 1-1 | 5 | 0.002 | 0.20 | 0.20 | 25 | 8.0 | 1.15 | $10^{13}$ | 19.1 | 88 | 0.6 | good | good |
| | 1-2 | 5 | 0.002 | 0.16 | 0.20 | 22 | 8.0 | 1.17 | $10^{14}$ | 19.5 | 87 | 0.7 | good | good |
| | 1-3 | 5 | 0.002 | 0.31 | 0.20 | 11 | 9.0 | 1.20 | $10^{11}$ | 19.3 | 89 | 0.5 | good | good |
| | 1-4 | 5 | 0.002 | 0.20 | 0.12 | 18 | 4.5 | 1.18 | $10^{13}$ | 19.1 | 89 | 0.8 | good | good |
| | 1-5 | 5 | 0.002 | 0.20 | 0.35 | 18 | 10.5 | 1.18 | $10^{12}$ | 19.2 | 87 | 0.4 | good | good |
| | 1-6 | 5 | 0.002 | 0.19 | 0.22 | 25 | 4.5 | 1.10 | $10^{13}$ | 18.8 | 88 | 0.6 | good | good |
| Comp. Ex. | 1-1 | 5 | 0.002 | 0.20 | 0.002 | 22 | 8.0 | 1.16 | $10^{13}$ | 9.8 | 84 | 2.9 | good | good |
| | 1-2 | 5 | 0.002 | 0.20 | 0.85 | 22 | 8.0 | 1.15 | $10^{14}$ | 19.9 | 90 | 0.3 | good | poor |
| | 1-3 | 5 | 0.002 | 0.006 | 0.20 | 22 | 8.0 | 1.14 | $10^{18}$ | 19.0 | 89 | 0.5 | good | good |
| | 1-4 | 5 | 0.002 | 1.25 | 0.20 | 22 | 8.0 | 1.14 | $10^{10}$ | 11.8 | 87 | 0.8 | good | poor |
| | 1-5 | 5 | 0.002 | 1.17 | 0.80 | 22 | 8.0 | 1.16 | $10^{10}$ | 12.4 | 87 | 0.6 | good | poor |
| | 1-6 | 5 | 0.002 | 0.20 | 0.20 | 22 | 0.8 | 1.13 | $10^{13}$ | 10.6 | 88 | 0.7 | good | poor |
| | 1-7 | 5 | 0.85 | 0.20 | 0.20 | 22 | 8.0 | 1.15 | $10^{14}$ | 19.0 | 94 | 0.6 | good | poor |
| | 1-8 | 5 | 0.0002 | 0.20 | 0.20 | 22 | 8.0 | 1.13 | $10^{13}$ | 19.2 | 67 | 1.5 | good | poor |
| | 1-9 | 5 | 0.002 | 0.20 | 0.20 | 22 | 25 | 1.15 | $10^{13}$ | 19.4 | 87 | 0.8 | poor | good |
| | 1-10 | 5 | 0.002 | 0.20 | 0.20 | 3 | 8.0 | 1.39 | $10^{11}$ | 20.4 | 86 | 0.6 | poor | good |
| | 1-11 | 5 | 0.002 | 0.20 | 0.20 | 67 | 8.0 | 1.08 | $10^{14}$ | 9.1 | 88 | 0.9 | good | good |
| | 1-12 | 5 | 0.000 | 0.00 | 0.00 | 0 | — | 1.42 | $10^{18}$ | 21.1 | 66 | 3.1 | poor | poor |

*based on 100 parts by weight of polyester
(A): Titanium dioxide (average particle diameter: 0.5 μm, cubic crystallin structure)
(B): Oxazole compound (C. I. Fluorescent Brightener 135)
(C): Potassium octylbenzenesulfonate
(D): Tetrakis 3,5-di-t-butylhydroxyphenylpropanoyloxymethylmethane

EXAMPLE 2-1

60 parts by weight of dimethyl terephthalate and 40 parts by weight of ethylene glycol were mixed and transesterified in the presence of a transesterification catalyst to form a polyethylene terephthalate monomer, i.e., bis-2-hydroxyethyl terephthalate. To the resultant, 5 parts by weight of titanium dioxide of cubic crystalline structure having an average particle diameter of 0.5 μm, 0.20 part by weight of tetrakis 3,5-di-t-butylhydroxyphenylpropanoyloxymethylmethane, 0.002 part by weight of oxazole compound (C. I. Fluorescent Brightener 135), 0.20 part by weight of potassium octylbenzenesulfonate, and a conventional polycondensation catalyst were added, and the mixture was polycondensed to obtain a polyester resin having an intrinsic viscosity of 0.610 dl/g. The obtained polyester resin and polystyrene(GP-PS) having a melting flow index of 8.0 g/10 min were melt-mixed at a ratio of 80:20 (polyester resin:polystyrene=100:25) under the temperature condition shown in table 2 below using a conventional compounding method to give a primary resin mixture.

The obtained resin mixture was dried, melted, and extruded to form a cast sheet. The sheet was extended in a draw ratio of 3.5 in a longitudinal and a transverse directions to provide a biaxially oriented polymeric film having the thickness of 100 μm.

The properties of the film were measured and the results are shown in Table 2.

As shown in Table 2 below, the film thus prepared exhibits excellent properties in general.

EXAMPLES 2-2

The procedure of Example 2-1 was repeated except that the amounts of the additives and the polystyrene resin were varied as shown in Table 2 below.

The properties of the film were measured and the results are shown in Table 2.

As shown in Table 2 below, the film thus prepared exhibits excellent properties in general.

COMPARATIVE EXAMPLES 2-1 to 2-10

The procedure of Example 2-1 was repeated except that the amounts of the additives and the polystyrene resin were varied as shown in Table 2 below.

The properties of the film were measured and the results are shown in Table 2.

As shown in Table 2 below, the films thus prepared exhibit poor properties in general.

TABLE 2

| | | Additives* | | | | Polystyrene* | | Melt Mixing Conditions | | | | | | | | | |
|---|---|---|---|---|---|---|---|---|---|---|---|---|---|---|---|---|---|
| | | | | | | | Melt flow | Temperature condition | | | | | | | Extruded Resin Temp. | Rotation Speed | Amount of Extrusion |
| unit | | (A) | (B) | (C) | (D) | Amount | index | | | | | | | | | | |
| | | | part by weight | | | | g/10 min | $T_1$ | $T_2$ | $T_3$ | $T_4$ | $T_5$ | $T_6$ | $T_f$ | $T_p$ | rpm | Kg/H |
| Ex | 2-1 | 5 | 0.002 | 0.20 | 0.20 | 25 | 8.0 | 245 | 255 | 260 | 260 | 260 | 260 | 260 | 275 | 400 | 30 |
| | 2-2 | 5 | 0.002 | 0.18 | 0.20 | 18 | 4.5 | 250 | 259 | 263 | 264 | 265 | 265 | 265 | 280 | 385 | 28 |
| Comp | 2-1 | 5 | 0.85 | 0.20 | 0.02 | 25 | 8.0 | 245 | 255 | 256 | 260 | 260 | 260 | 260 | 275 | 389 | 28 |
| Ex | 2-2 | 5 | 0.0002 | 0.20 | 0.20 | 25 | 8.0 | 245 | 255 | 255 | 260 | 260 | 260 | 260 | 275 | 400 | 27 |
| | 2-3 | 5 | 0.002 | 0.006 | 0.20 | 25 | 8.0 | 245 | 255 | 255 | 260 | 260 | 260 | 260 | 275 | 400 | 27 |
| | 2-4 | 5 | 0.002 | 1.25 | 0.20 | 25 | 8.0 | 245 | 255 | 255 | 261 | 261 | 264 | 264 | 275 | 400 | 25 |
| | 2-5 | 5 | 0.002 | 0.20 | 0.002 | 25 | 8.0 | 245 | 255 | 255 | 260 | 260 | 260 | 260 | 275 | 400 | 27 |
| | 2-6 | 5 | 0.002 | 0.20 | 0.85 | 25 | 8.0 | 245 | 255 | 255 | 260 | 260 | 260 | 260 | 275 | 400 | 27 |
| | 2-7 | 5 | 0.002 | 0.20 | 0.20 | 3 | 8.0 | 245 | 255 | 255 | 261 | 261 | 264 | 264 | 275 | 400 | 25 |
| | 2-8 | 5 | 0.002 | 0.20 | 0.20 | 67 | 8.0 | 245 | 255 | 255 | 260 | 260 | 264 | 265 | 275 | 398 | 28 |
| | 2-9 | 5 | 0.002 | 0.20 | 0.20 | 25 | — | 170 | 175 | 180 | 180 | 185 | 185 | 190 | 210 | 250 | 30 |
| | 2-10 | 5 | 0 | 0 | 0 | 0 | — | — | — | — | — | — | — | — | — | — | — |
| | 2-11 | 5 | 0.002 | 0.00 | 0.00 | 25 | 8.0 | — | — | — | — | — | — | — | — | — | — |

| | | Physical properties of film | | | | | | |
|---|---|---|---|---|---|---|---|---|
| | Bulk unit | Density g/cc | Resistance $\Omega$ | Surface at Breakage kg/mm² | Strenthtivity | Reflec- 440 nm % | Color- b | Touch-iness | Appear-rance |
| Ex | 2-1 | 1.15 | $10^{12}$ | 19.1 | 88 | 0.6 | ○ | ○ |
| | 2-2 | 1.17 | $10^{13}$ | 19.3 | 89 | 0.6 | ○ | ○ |
| Comp | 2-1 | 1.16 | $10^{12}$ | 19.0 | 94 | 0.6 | ○ | ○ |
| Ex | 2-2 | 1.17 | $10^{12}$ | 19.2 | 67 | 1.5 | ○ | ○ |
| | 2-3 | 1.14 | $10^{18}$ | 19.0 | 88 | 0.7 | ○ | ○ |
| | 2-4 | 1.15 | $10^{10}$ | 11.8 | 87 | 0.6 | ○ | ○ |
| | 2-5 | 1.15 | $10^{12}$ | 9.8 | 88 | 1.0 | Δ | ○ |
| | 2-6 | 1.17 | $10^{13}$ | 19.9 | 90 | 0.5 | Δ | ○ |
| | 2-7 | 1.37 | $10^{12}$ | 20.4 | 88 | 0.8 | x | ○ |
| | 2-8 | 1.08 | $10^{13}$ | 10.3 | 87 | 0.6 | ○ | ○ |
| | 2-9 | 1.16 | $10^{12}$ | 18.2 | 86 | 0.7 | ○ | ○ |
| | 2-10 | 1.42 | $10^{18}$ | 21.7 | 66 | 3.1 | x | ○ |
| | 2-11 | 1.18 | $10^{12}$ | 17.5 | 87 | 0.8 | Δ | x |

*based on 100 parts by weight of polyester
(A): Titanium dioxide (average particle diameter: 0.5 μm, cubic crystallin structure)
(B): Oxazole compound (C. I. Fluorescent Brightener 135)
(C): Potassium octylbenzensulfonate
(D): Tetrakis 3,5-di-t-butylhydroxypheylpropanoyloxymethylmethane
○:good, Δ: common, x: poor

EXAMPLE 3-1

60 parts by weight of dimethyl terephthalate and 40 parts by weight of ethylene glycol were mixed and transesterified in the presence of a conventional transesterification catalyst to form a polyethylene terephthalate monomer, i.e., bis-2-hydroxyethyl terephthalate. To the resultant, 0.20 part by weight of potassium octylbenzenesulfonate and a conventional polycondensation catalyst were added and the mixture was polycondensed to obtain a polyester resin having an intrinsic viscosity of 0.610 dl/g.

100 parts by weight of the obtained polyester resin, 20 parts by weight of homopolypropylene resin having a melt flow index of 4.5 g/10 min, and 35% by weight of polystyrene(GP-PS) having a melt flow index of 4.5 g/10 min based on the weight of the polypropylene resin were melt-mixed under the temperature shown in table 3 using a conventional compounding method to give a primary resin mixture. As the operating conditions, $T_i$ and $T_f$ were 245° C. and 260° C., respectively, screw rotation speed was 200–250 rpm and the amount of extrusion was 30Kg/H, and $T_p$ was 275° C.

The obtained resin mixture was dried, melted, and extruded to form a cast sheet. The sheet was extended in a draw ratio of 3.5 in a longitudinal and a transverse directions to provide a biaxially oriented polymeric film having the thickness of 125 μm.

The properties of the film were measured and the results are shown in Table 3.

As shown in Table 3 below, the film thus prepared exhibits excellent properties in general.

EXAMPLES 3-2

The procedure of Example 3-1 was repeated except that the amounts of the polypropylene resin, the polystyrene resin and the potassium octylbenzenesulfonate, melting temperature, rotation speed and the amount of extrusion were varied as shown in Table 3 below.

The properties of the film were measured and the results are shown in Table 3.

As shown in Table 3 below, the film thus prepared exhibits excellent properties in general.

COMPARATIVE EXAMPLES 3-1 to 3-6

The procedure of Example 3-1 was repeated except that the amounts of the polypropylene resin, the polystyrene resin and the potassium octylbenzenesulfonate, melting temperature, rotation speed and the amount of extrusion were varied as shown in Table 3 below.

The properties of the film were measured and the results are shown in Table 3.

As shown in Table 3 below, the film thus prepared exhibit poor properties in general.

draw ratio of 3.5 in a longitudinal and a transverse directions to provide a biaxially oriented polymeric film having the thickness of 100 μm.

The properties of the film were measured and the results are shown in Table 4.

As shown in Table 4 below, the film thus prepared exhibits excellent properties in general.

EXAMPLES 4-2 to 4-6

The procedure of Example 4-1 was repeated except that the amounts of the additives, and the amounts and the melt

TABLE 3

| | | Poly-propyl-ene* | Poly-rene* | OBS-K* | Melt Mixing Conditions | | | | | | | | | |
|---|---|---|---|---|---|---|---|---|---|---|---|---|---|---|
| | | | | | Temperature condition | | | | | | | Ex-truded Resin Temp. | Rota-tion Speed | Amount of Extru-sion |
| unit | | part(s) | wt % | part | $T_1$ | $T_2$ | $T_3$ | $T_4$ | $T_5$ | $T_6$ | $T_r$ | $T_p$ | rpm | Kg/H |
| Ex | 3-1 | 20 | 35 | 0.20 | 245 | 255 | 260 | 260 | 260 | 260 | 260 | 275 | 400 | 30 |
| | 3-2 | 35 | 30 | 0.18 | 250 | 259 | 263 | 264 | 265 | 265 | 265 | 280 | 385 | 28 |
| Comp Ex | 3-1 | 20 | 80 | 0.20 | 245 | 255 | 255 | 260 | 260 | 260 | 260 | 275 | 400 | 27 |
| | 3-2 | 20 | 10 | 0.24 | 245 | 255 | 255 | 261 | 261 | 264 | 264 | 275 | 400 | 25 |
| | 3-3 | 20 | 35 | 0. | 245 | 255 | 255 | 260 | 260 | 265 | 265 | 275 | 398 | 28 |
| | 3-4 | 20 | 35 | 0.20 | 170 | 175 | 180 | 185 | 185 | 190 | 190 | 210 | 250 | 30 |
| | 3-5 | 0 | 0 | 0. | — | — | — | — | — | — | — | — | — | — |
| | 3-6 | 20 | 35 | 0.20 | — | — | — | — | — | — | — | — | — | — |

| | | Physical properties of film | | | | | | |
|---|---|---|---|---|---|---|---|---|
| unit | | Bulk Dens-ity g/cc | Surface Resist-ance Ω | Strength at Breakage kg/mm² | Print-ability | Touchi-ness | Process-ability | Unifor-mity |
| Ex | 3-1 | 0.95 | $10^{12}$ | 17.9 | o | o | A | A |
| | 3-2 | 0.90 | $10^{11}$ | 16.8 | o | o | A | A |
| Comp Ex | 3-1 | 0.94 | $10^{13}$ | 16.5 | o | x | B | A |
| | 3-2 | 1.25 | $10^{11}$ | 17.2 | x | o | A | A |
| | 3-3 | 0.96 | $10^{18}$ | 17.5 | o | o | A | A |
| | 3-4 | 1.07 | $10^{12}$ | 16.9 | Δ | Δ | B | C |
| | 3-5 | 1.40 | $10^{18}$ | 22.0 | Δ | x | A | A |
| | 3-6 | 1.02 | $10^{12}$ | 17.1 | Δ | Δ | C | D |

*based on 100 parts by weight of polyester
**based on the weight of polypropylene
OBS-K: Potassium octylbenzenesulfonate
o: good, Δ: common, x: poor
part(s) and wt % mean part(s) by weight and % by weight, respectively.

EXAMPLE 4-1

60 parts by weight of dimethyl terephthalate and 40 parts by weight of ethylene glycol were mixed and transesterified in the presence of a conventional transesterification catalyst to form a polyethylene terephthalate monomer, i.e., bis-2-hydroxyethyl terephthalate. To the resultant, 5 parts by weight of titanium dioxide of cubic crystalline structure having an average particle diameter of 0.5μm, 0.20 part by weight of tetrakis 3,5-di-t-butylhydroxyphenylpropanoyloxymethylmethane, and a conventional polycondensation catalyst were added and the mixture was polycondensed to obtain a polyester resin having an intrinsic viscosity of 0.620 dl/g.

The obtained polyester and polypropylene having a melt flow index of 8.0 g/10 min were melt-mixed at a ratio of 85:15 (polyester resin:polypropylene resin=100:18) using a conventional compounding method to give a primary resin mixture.

The obtained resin mixture was dried, melted, and extruded to form a cast sheet. The sheet was extended in a flow index of the polyolefin resin were varied as shown in Table 4 below.

The properties of the film were measured and the results are shown in Table 4.

As shown in Table 4 below, the film thus prepared exhibits excellent properties in general.

COMPARATIVE EXAMPLES 4-1 to 4-10

The procedure of Example 4-1 was repeated except that the amounts of the additives, and the amounts and the melt flow index of the polyolefin resin were varied as shown in Table 4 below.

The properties of the film were measured and the results are shown in Table 4.

As shown in Table 4 below, the film thus prepared exhibit poor properties in general.

TABLE 4

| | | Additives* (A) | (B) | (C) | Polypropylene* Amount | Melt flow index g/10 min | Bulk Density g/cc | Surface Resistance Ω | Strength at Breakage kg/mm² | Color b | Touchiness | Appearance |
|---|---|---|---|---|---|---|---|---|---|---|---|---|
| | unit | | part by weight | | | | | | | | | |
| Ex. | 4-1 | 5 | 0.20 | 0.20 | 8 | 4.5 | 1.06 | $10^{13}$ | 18.2 | 0.6 | good | good |
| | 4-3 | 5 | 0.31 | 0.20 | 11 | 6.0 | 1.11 | $10^{11}$ | 18.7 | 0.5 | good | good |
| | 4-4 | 5 | 0.20 | 0.12 | 18 | 2.0 | 1.10 | $10^{13}$ | 18.0 | 0.8 | good | good |
| | 4-5 | 5 | 0.20 | 0.35 | 18 | 12.0 | 1.09 | $10^{12}$ | 18.4 | 0.4 | good | good |
| | 4-6 | 5 | 0.19 | 0.22 | 25 | 2.0 | 1.02 | $10^{13}$ | 17.9 | 0.6 | good | good |
| Comp. | 4-1 | 5 | 0.20 | 0.002 | 22 | 4.5 | 1.07 | $10^{13}$ | 9.3 | 3.8 | good | good |
| Ex. | 4-2 | 5 | 0.20 | 0.85 | 22 | 4.5 | 1.06 | $10^{14}$ | 19.4 | 0.3 | good | good |
| | 4-3 | 5 | 0.006 | 0.20 | 22 | 4.5 | 1.05 | $10^{18}$ | 18.1 | 0.5 | good | good |
| | 4-4 | 5 | 1.25 | 0.20 | 22 | 4.5 | 1.06 | $10^{10}$ | 11.3 | 0.8 | good | poor |
| | 4-5 | 5 | 1.17 | 0.80 | 22 | 4.5 | 1.08 | $10^{10}$ | 11.7 | 0.6 | good | poor |
| | 4-6 | 5 | 0.20 | 0.20 | 22 | 0.5 | 1.05 | $10^{12}$ | 10.1 | 0.7 | good | poor |
| | 4-7 | 5 | 0.20 | 0.20 | 22 | 35.0 | 1.07 | $10^{13}$ | 18.9 | 0.8 | poor | good |
| | 4-8 | 5 | 0.20 | 0.20 | 3 | 4.5 | 1.37 | $10^{11}$ | 20.2 | 0.6 | poor | good |
| | 4-9 | 5 | 0.20 | 0.20 | 82 | 4.5 | 0.89 | $10^{14}$ | 8.4 | 0.9 | good | good |
| | 4-10 | 5 | 0.00 | 0.00 | 0 | — | 1.42 | $10^{18}$ | 21.1 | 1.5 | poor | good |

*based on 100 parts by weight of polyester
(A): Titanium dioxide (average particle diameter: 0.5 μm, cubic crystallin structure)
(B): Potassium octylbenzenesulfonate
(C): Tetrakis 3,5-di-t-butylhydroxyphenylpropanoyloxymethylmethane As shown from the results of the above, the inventive polymeric film, preferably prepared by the process of the present invention possesses an improved antistatic property, printability and heat stability as well as good touchiness and appearance.

While the invention has been described in connection with the above specific embodiments, it should be recognized that various modifications and changes may be made within the scope of the invention as defined by the claims that follow.

What is claimed is:

1. A polymeric film prepared by a process which comprises: compounding a film forming resin mixture in a compounder; extruding the mixture to give a cast sheet; extending the sheet to form the film, wherein the film forming resin mixture contains 100 parts by weight of a polyester resin having an intrinsic viscosity ranging from 0.4 to 0.9 dl/g, 5 to 50 parts by weight of a polyolefin resin having a melt flow index ranging from 1.0 to 25 g/10 min and/or a styrene resin having a melt flow index ranging from 1.5 to 20 g/10 min, and 0.01 to 1.0 part by weight of a metal sulfonate of the following formula (I) having an acid value of 1.0mg KOH/g or less:

$$R_1-C_6H_4-SO_3Me \qquad (I)$$

wherein, $R_1$ is a $C_5-C_{20}$ alkyl group; and

Me is an alkali metal or alkali earth metal; and the compounding and extruding steps are carried out under the condition satisfying the following formulae:

$$200° C. \leq T_i \leq 250° C.$$

$$T_f = T_r + 30° C. \text{ and}$$

$$T_f + 10° C. \leq T_p \leq T_f + 50° C.$$

wherein, $T_i$ is an initial inlet temperature of the compounder;

$T_f$ is an outlet temperature of the compounder; and $T_p$ is a temperature of the extruded resin mixture.

2. The polymer film of claim 1, wherein said polymer film further comprises 0.005 to 0.5 part by weight of a hindered phenol compound and/or 0.0005 to 0.5 part by weight of an organic fluorescent whitening agent.

3. The polymer film of claim 1, wherein said polymer film comprises 100 parts by weight of the polyester resin, 5 to 40 parts by weight of the polyolefin resin, 20 to 50 wt % of the styrene resin based on the weight of the polyolefin resin, and 0.01 to 1.0 part by weight of the metal sulfonate.

4. The polymer film of claim 1, wherein said polymer film comprises 100 parts by weight of the polyester resin, 5 to 50 parts by weight of the styrene resin, 0.01 to 1.0 part by weight of the metal sulfonate, 0.005 to 0.5 part by weight of a hindered phenol compound and 0.0005 to 0.5 part by weight of an organic fluorescent whitening agent.

5. The polymer film of claim 1, wherein said polymer film comprises 100 parts by weight of the polyester resin, 5 to 50 parts by weight of the polyolefin resin, 0.01 to 1.0 part by weight of the metal sulfonate and 0.005 to 0.5 part by weight of a hindered phenol compound.

6. The polymer film of claim 1, wherein said metal sulfonate is selected from the group consisting of potassium octylbenzene sulfonate, potassium nonylbenzene sulfonate, potassium undecylbenzene sulfonate and a mixture thereof.

7. The polymer film of claim 2, wherein said hindered phenol compound is selected from the group consisting of tetrakis 3,5-di-t-butylhydroxyphenylpropanoyloxymethylmethane, octadecyl-3,5-di-t-butyl-4-hydroxyphenylpropanoate, 2-hydroxy-4-n-oxybenzophenone, 2,4-di-t-butylphenyl-3,5-di-t-butyl-4-hydroxybenzoate and a mixture thereof.

8. The polymer film of claim 2, wherein said organic fluorescent whitening agent is selected from the group consisting of stilbenes, oxazoles, bisbenzoazoles and mixtures thereof.

* * * * *